United States Patent [19]

Epplett

[11] Patent Number: 5,201,487
[45] Date of Patent: Apr. 13, 1993

[54] VEHICULAR ROOFTOP RAIL MOUNT-TO-GUTTER MOUNT ADAPTOR SYSTEM

[76] Inventor: Richard E. Epplett, 88500 Greenhill Rd., Eugene, Oreg. 97402

[21] Appl. No.: 870,273

[22] Filed: Apr. 17, 1992

[51] Int. Cl.⁵ .............................................. A47F 5/00
[52] U.S. Cl. .................... 248/298; 248/544; 224/309
[58] Field of Search ............... 248/544, 503, 298; 224/309, 321, 329

[56] References Cited

U.S. PATENT DOCUMENTS

| | | |
|---|---|---|
| 2,807,398 | 9/1957 | Mathews . |
| 3,325,067 | 6/1967 | Helm . |
| 3,731,967 | 5/1973 | Hughes . |
| 3,907,184 | 9/1975 | Zane et al. . |
| 3,917,136 | 11/1975 | Carson . |
| 4,106,680 | 8/1978 | Bott . |
| 4,132,335 | 1/1979 | Ingram . |
| 4,222,508 | 9/1980 | Bott . |
| 4,270,681 | 6/1981 | Ingram . |
| 4,358,037 | 11/1982 | Heideman . |
| 4,383,627 | 5/1983 | Ingram ............... 248/544 X |
| 4,410,211 | 10/1983 | Kloppe et al. . |
| 4,416,406 | 11/1983 | Popeney . |
| 4,431,123 | 2/1984 | Bott ...................... 224/321 |
| 4,432,478 | 2/1984 | Bott ...................... 224/321 |
| 4,473,178 | 9/1984 | Bott . |
| 4,516,709 | 5/1985 | Bott . |
| 4,524,893 | 6/1985 | Cole . |
| 4,589,557 | 5/1986 | Bollmann . |
| 4,602,756 | 7/1986 | Chatfield . |
| 4,688,706 | 8/1987 | Thulin . |
| 4,848,629 | 7/1989 | Mobius ................ 224/309 X |
| 4,877,169 | 10/1989 | Grim . |
| 4,899,917 | 2/1990 | Bott . |
| 4,911,348 | 3/1990 | Rasor et al. . |
| 4,915,342 | 4/1990 | Nilsson . |
| 4,982,886 | 1/1991 | Cucheran . |

Primary Examiner—Ramon O. Ramirez
Attorney, Agent, or Firm—Kolish, Hartwell, Dickinson, McCormack & Heuser

[57] ABSTRACT

An adaptor system for mounting a gutter mount-type accessory on a rail mount-type vehicle's rooftop is disclosed. The system includes plural adaptor assemblies each including an extruded bracket member having a planar bottom surface for mating the upper surface of a mounting rail, and an edge region including first and opposing shoulder regions for secure gripping by a depending strut member and a hooked member that form a part of a gripping means in a rooftop accessory or accessory carrier. Preferably the first shoulder region has a first recess extending a predefined distance along and in parallel with the edge region, with the first recess being dimensioned to receive partly therein the depending strut. The second shoulder region preferably is defined as an upper surface of a second recess extending along and in parallel with the edge region for receiving partly therein a hooked member that forms another part of the gripping means. Each assembly also includes plural rail inserts slidably receivable within the rail channel and securable for fixable sliding therein to the bracket member by threaded fasteners that extend through holes formed in the bracket member and into tapped holes in the inserts.

11 Claims, 1 Drawing Sheet

VEHICULAR ROOFTOP RAIL MOUNT-TO-GUTTER MOUNT ADAPTOR SYSTEM

BACKGROUND AND SUMMARY OF THE INVENTION

This invention generally to vehicle rooftop rail mount systems. More particularly, it concerns an adaptor system that can be installed on rail mount systems to accommodate accessories or accessory carriers made for gutter mount systems.

Known vehicle rooftop gutter mount systems mount accessories or accessory carriers to the laterally spaced gutters that run fore and aft on either side of older vehicles such as cars. Known vehicle rooftop rail mount systems mount accessories or accessory carriers to the laterally spaced rails that run fore and aft on either side of certain newer vehicles such as vans and light passenger trucks. Gutter mount accessories and accessory carriers are widely available, but rail mount accessories and accessory carriers are difficult if not impossible to find.

Known vehicle rooftop "fake gutter" mount systems, i.e. systems that provide a generally gutter-shaped region for gripping by a gutter mount accessory or accessory carrier, require modification to the roof of the vehicle on which they are installed. Such modification typically includes exposing the roof of a vehicle by laying back interior covers and padding at four corners, drilling four pairs of holes through the roof, installing fake gutter mounts at each corner via fasteners that extend through the holes, securing the fasteners and replacing the interior covers and padding. Perhaps needless to say, such radical modification of a relatively new vehicle by its owner causes legitimate concerns regarding adverse impacts on the air-, water- and sound-proofness of the vehicle's interior, as well as adversely impacting on the vehicle's warranty coverage, aesthetic appeal and resale value.

A principal object of the invention is to provide a system for mounting a gutter mount-type accessory or accessory carrier to the rooftop of a vehicle having no gutter but having a rail mount system.

Another object of the invention is to provide such a system that is compatible with all known vehicle rail mount systems and all known gutter mount-type accessories and accessory carriers.

It is another important object to provide a durable, reliable and secure system having substantial carrying capacity.

Yet another object is to provide such a system that has few parts and is easily assembled/installed by a vehicle owner having average skill and common hand-tools.

Yet another object is to provide such a system that is easily manufactured and cost effective.

Very briefly summarizing the invention in its preferred embodiment, an adaptor bracket assembly is provided including an extruded bracket member having a planar bottom surface for mating with the upper surface of a vehicle's rail and an outer edge region including first and opposing shoulder regions configured for being grippingly engageable by a gripping means of a gutter mount-type accessory or accessory carrier. The preferred system also includes a planar insert slidably receivable within a channel of the rail, with the insert being fastenable to the bracket member for fixable sliding of both along the rail.

Preferably, the first shoulder region includes on an inclined first surface thereof a first recess extending a predefined distance along and in parallel with the edge region, the first recess being dimensioned for receiving partway therein a depending strut of the gripping means, thereby to limit sliding movement between the bracket member and the accessory or accessory carrier. Preferably, the opposing shoulder region includes an upper grippable surface formed by a second recess, the grippable surface extending in parallel with the inclined first surface for receiving partway therein a hooked member of the gripping means. Preferably, the fastener is a bolt that extends through a counterbored hole formed in the bracket member and into a tapped hole formed in the insert. The adaptor assembly is compatible with most known rail and accessory/carrier systems and is grippable thereby for substantial load-carrying capacity, stability and security.

These and other objects and advantages of the invention will become more readily apparent by reading the following description and by referring to the accompanying drawings.

DETAILED DESCRIPTION OF THE PREFERRED EMBODIMENT

Figure 1:
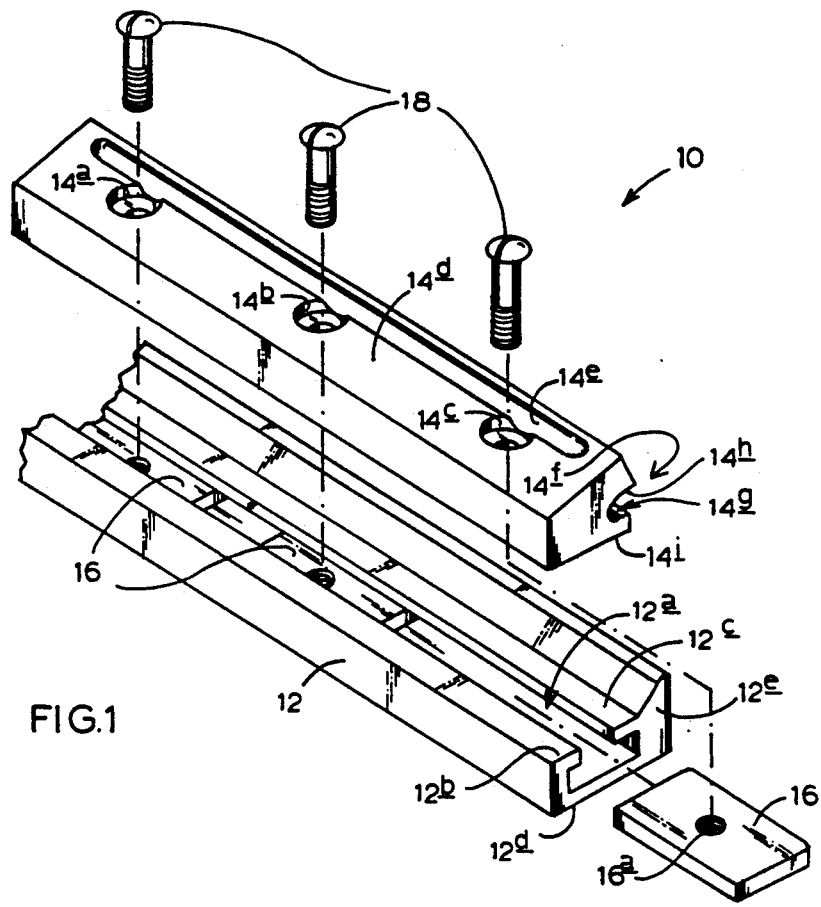
FIG. 1 is an exploded isometric view of the invention made in accordance with its preferred embodiment, as used with existing rail systems.

Referring first to FIG. 1, the adaptor device, or bracket assembly, of the preferred embodiment of the invention is indicated generally at 10. Device 10 provides for the securely gripping mating of a vehicular rooftop, gutter-type mounting accessory or accessory carrier to a vehicular rooftop rail system comprising plural, e.g. dual, laterally spaced lengthwise extending rails or channel members, a typical one of which is indicated generally at 12. Device 10 preferably includes a bracket member 14, One Or more and preferably three slide inserts or members 16 and a corresponding number of threaded fasteners such as bolts 18. It will be appreciated that preferably one or more pairs of devices 10 may be provided for mounting on two laterally spaced vehicle rails 12 for use with a vehicle accessory or accessory carrier, as will be described by reference to FIGS. 2 and 3.

Rail 12 shown in FIG. 1 is typical of the rail systems that may be found on vehicles that are not equipped with gutters, and forms no part of the present invention. Typically, rail 12 as shown includes a lengthwise extending channel 12a of rectangular cross section that is partially closed along its upper extent by inwardly and outwardly opposing planar expanses 12b, 12c. Those of ordinary skill will appreciate that rail 12 typically includes a planar bottom surface 12d that is permanently affixed to the rooftop of a vehicle (not shown). The skilled also will appreciate that rail 12 typically includes an outer, upwardly extending lip region 12e.

Each insert 16 preferably is planar and rectangular, is dimensioned to be slidably received within channel 12a of rail 12 and has a tapped hole 16a formed therein for receiving a bolt 18. It will be appreciated that one or more inserts 16 may be introduced into channel 12a at either end of the latter, and conveniently may be slid into a desired location therealong. Inserts 16 may be made of any suitable material such as aluminum (Al) or steel. Three holes 14a, 14b, 14c are formed in device 14 to receive preferably stainless steel bolts 18 therethrough, with holes 14a, 14b, 14c located substantially centrally from side to side and at a desired spacing relative to the overall length of member 14.

In accordance with the preferred embodiment of the invention, member 14 is approximately 16.5 cm (6.5 in) long, and the spacing between adjacent holes is approximately 5.7 cm (2.25 in). In the preferred embodiment, member 14 is extruded Al bar stock, and is approximately 2.0 cm (0.8 in) high and 2.5 cm (1.0 in) wide, although it will be appreciated that member 14 may be formed of any suitable material, by any suitable process and to any suitable dimensions. In accordance with a proposed modification, holes 14a, 14b, 14c might be tapped to provide a keeper mechanism for bolts 18.

As is suggested by the dash-dot lines of FIG. 1, bolts 18 extending through preferably counterbored holes 14a, 14b, 14c and between expanses 12b, 12c may be threadedly secured in corresponding tapped holes 16a of inserts 16, thereby to secure bracket member 14 at any desired position along rail 12 on a plane defined by the co-planar, upper surfaces of expanses 12b, 12c. It will be appreciated that the illustrated three bolt and three insert threaded configuration shown in FIG. 1 provides for the extremely secure mounting of device 10 on rail 12, and that there is, with bolts 18 tightly fastened, no possibility of inadvertent sliding or release therebetween.

Importantly, member 14 is provided with an upper generally planar, and preferably approximately 17° inclined, surface, or first shoulder region, 14d for supporting a rooftop accessory, shoulder region 14d having formed therein a first recess 14e that extends preferably approximately 15.2 cm (6.0 in) along the substantial length of member 14 in what will be referred to herein as an outer edge region 14f of member 14, with recess 14e preferably extending in parallel with edge region 14f. Recess 14e is dimensioned to receive preferably at least partway therein a depending strut or standoff member of what will be referred to herein as gripping means of an accessory or accessory carrier, as will be more clearly understood by later reference to FIGS. 2 and 3. In the preferred embodiment, first recess 14e is approximately 0.64 cm (¼ in) wide and 0.32 cm (⅛ in) deep, and is formed using a ball end mill.

Also importantly, edge region 14f has formed in an outer subregion thereof a second recess 14g that extends in accordance with the preferred embodiment of the invention along the entire extent of member 14. As will be seen, second recess 14g is dimensioned to receive preferably at least partway therein a terminal end of a hooked member of the accessory or carrier's gripping means. In the preferred embodiment, second recess 14g is approximately 8.4 cm (⅜ in) wide and of approximately the same depth.

Figure 2:
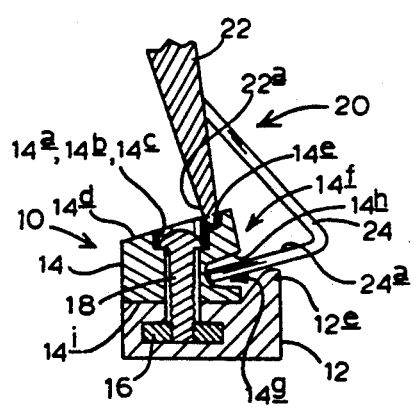
FIG. 2 is a detailed front elevation of the invention corresponding with FIG. 1, showing fragmentarily an accessory mounted thereby, taken generally along the lines 2—2 of FIG. 3.
Figure 3:
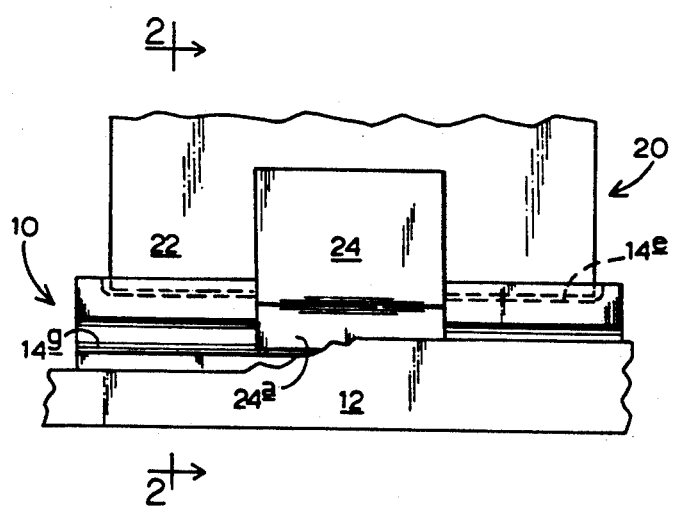
FIG. 3 is a detailed side elevation of the invention corresponding with FIG. 2.

Referring collectively now to FIGS. 2 and 3, member 14 will be described further by way of the manner in which an accessory or accessory carrier is made grippingly to engage it for the secure attachment of an accessory or accessory carrier to the roof of a vehicle equipped with the illustrated rail system. A planar bottom surface 14i of bracket member 14 is configured for mating, and is dimensioned laterally to fit along, a planar upper support surface of rail 12 defined by expanses 12b, 12c. A gripping mechanism, or means for gripping a rooftop gutter, 20 of a typical accessory or accessory carrier is seen to include a depending strut or standoff member 22 that supports the substantial weight of the accessory and/or carrier. Gripping means 20 is seen also to include a hooked member 24 having an expanse 24a that extends inwardly (of the accessory/carrier's outer periphery) at approximately a right angle to depending strut 22. It will be appreciated by those skilled in the art that strut 2 and member 24 typically are articulable relative to one another, with member 24 being fixedly and securely positioned relative to member 24, for example, by a thumb screw (not shown) or by a push-button releasable, spring loaded capture/release mechanism such as that indicated in FIGS. 2 and 3.

FIGS. 2 and 3 illustrate how gripping means 20 securely mate with member 14 of invented device 10, with a terminal end 22a of depending strut 22 resting partway within first recess 14e and with a terminal end of expanse 24a of hooked member 24 resting partway within second recess 14g. With member 24 securely fixedly positioned relative to strut 22, gripping means 20 may be seen grippingly to seize edge region 14f of member 14.

Importantly, gripping means 20 does so without interference with lip region 12e of rail 12, by virtue of inclined surface 14d and an upper surface 14h of second recess 14g that is inclined in parallel therewith. Upper surface 14h is described herein as a second shoulder region that generally opposes first shoulder region 14d. The opposing shoulder regions 14d, 14h formed within edge region 14f of member 14 are easily and positively grippable by gripping means 20 to secure a rooftop accessory to adaptor device 10. In cross section, bracket member 14 may be seen to be generally C-shaped, and importantly has its second recess 14g elevated a predetermined height, e.g. preferably approximately 0.32 cm (⅛ in), above bottom surface 14i, thereby providing clearance above lip region 12e for terminal expanse 24a of hooked member 24 to grippingly engage second recess 14g. It will be appreciated that, when used with rails similar to rail 12 that have no such lip region 12e, device 10 nonetheless provides for the mounting of an accessory or accessory carrier to the roof of a vehicle at a proper angle, e.g. 17°, corresponding to the angle from the vertical that gripping means 20 thereof generally depends.

From FIGS. 1 through 3 and the discussion above, it may be seen that bolts 18 threadedly received within a tapped hole 16a of insert, or slide member, 16 provides means for securing together bracket member 14 and slide member 16 such that bracket member 14 and slide member 16 securely capturably and slidably are engageable with rail, or channel member, 12 to provide for the secure gripping engagement of edge region 14f by gripping means 20 of an accessory or accessory carrier. It will be appreciated that this securing means may take the alternative form of a threaded post, e.g. a set screw, that is threadedly engageable with a tapped hole formed within one or both of bracket member 14 and slide member 16. It also will be appreciated that this securing means may take the form of a threaded post affixed to and extending upwardly from slide member 16, between expanses 12a, 12b of rail 12 and through One of holes 14a, 14b, 14c of bracket member 14, with the post being captured securely by a nut within counterbores identically formed therein. Any securing means is within the spirit of the invention.

FIG. 3 best shows an additional advantage of the invention. It may be seen from FIG. 3 that lengthwise, or fore and aft, relative sliding movement between strut 22 (and thus gripping means 20 of the accessory) and bracket member 14 (and thus adaptor device 10) is limited by the limited lengthwise extent of first recess 14e relative to the corresponding length of standoff member 22. This is so that, even if there remains or develops some play in gripping means 20 during operation and incidental vibration of the vehicle such that there is less than ideal gripping engagement with member 14, still the accessory or carrier will not slide without limit lengthwise along rail 12. This is because the fore or aft edge of strut 22 eventually would come into contact with a fore or aft end region of first recess 14e beyond which no further sliding movement could occur. This is a great advantage of the predefined, intentionally limited lengthwise extent of first recess 14e, and gives added security against inadvertent loss of an accessory or accessory carrier from the vehicle's rooftop.

So, it will be appreciated that first recess 14e formed along surface 14d of edge region 14f is dimensioned laterally and lengthwise to receive terminal end 22a of standoff member or strut 22 such that the accessory or accessory carrier is securely fixed relative to adaptor device 10 against movement either lateral or fore and aft along the vehicle's rooftop. Inadvertent movement therebetween is prevented and yet the position of the accessory or accessory carrier fore and aft along the rooftop easily can be adjusted by sliding device 10, with the accessory or accessory carrier securely attached thereto, along rail 12. Also, recess 14e in cross section is generally circularly formed in both extents (compare FIGS. 2 and 3) so that its extreme lateral and fore and aft surfaces tend to urge strut 22 into place despite, for example, slightly differently dimensioned or toleranced accessories and accessory carriers. Thus, recess 14e—which is limited in both its lengthwise and lateral extents to conform generally with the dimensions of terminal end 22a of strut 22, and provides transition zones around its entire periphery by its smoothly, circularly tapered extrema for insertion therein of strut 22—may be understood to provide for the conveniently targeted securement in two orthogonal axes of depending strut 22.

It may be seen from FIG. 2 that second recess 14g substantially limits movement of the terminal end of expanse 24a of hooked member 24, by virtue of its generally conforming cross-sectional dimension and shape. It may be seen best by reference to FIG. 2 that strut 22 and hooked member 24 of gripping means 20 relatively deeply may be seated within their respective recesses 14e, 14g, thereby positively and securely to capture an accessory or accessory carrier. As gripping means 20 is tightened (by conventional means described but not shown herein), an extremely secure gripping engagement between an accessory or accessory carrier and the vehicle's rooftop rail mounting system is achieved, thereby preventing damage to or accidental loss of carriers or accessories such as luggage, skis, surfboards, etc.

The invented adaptor device 10 thus renders possible that which heretofore was impossible: the secure mounting of gutter mount-type accessories and accessory carriers to rooftops of vehicles having no gutters but having instead rail-type mounting systems. The bracket member of device 10 in its preferred embodiment is formed such that it provides universal adaptability to various rail systems including those with outer, upwardly extending lip regions, while providing also unprecedented security against sliding of an accessory or accessory carrier gripping the member. Countersunk securement of the bolts with their heads not extending above the bracket member's inclined expanse avoids outside interference with, and unintentional loosening of, the bolts.

Accordingly, while the invention has been shown and described with reference to a preferred apparatus, it will be understood by those skilled in the art that changes might be made thereto without departing from the spirit of the invention, yet while achieving many of the advantages of the invention.

It is claimed and desired to secure by Letters Patent:

1. For use with a vehicular rooftop rail system including plural laterally spaced channel members and with a vehicular rooftop accessory including means for gripping a vehicular rooftop gutter, such gutter-gripping means including a downwardly depending standoff member, an adaptor device comprising:
   a bracket member including a generally planar bottom surface configured for mating an upper surface of one of such channel members, said bracket member further including an edge region having a recess therein for receiving such standoff member, said edge region being securely engageable by such gripping means with such standoff member extending downwardly into said recess;
   a slide member slidably receivable within such one channel member; and
   means for securing together said bracket member and said slide member such that said bracket member and said slide member securely capturably slidably are engageable with such one channel member to provide for the secure gripping engagement of said edge region by such gripping means.

2. The device of claim 1 wherein said securing means includes a threaded post threadedly engageable with a tapped hole formed within at least one of said bracket member and said slide member.

3. The device of claim 1 wherein said securing means includes a threaded fastener.

4. For use with a vehicular rooftop rail system including plural laterally spaced channel members and with a vehicular rooftop accessory including means for gripping a vehicular rooftop gutter in which such gripping means includes a downwardly depending standoff member, an adaptor device comprising:
   a bracket member including a generally planar bottom surface configured for mating an upper surface of one of such channel members, said bracket member further including an edge region securely engageable by such gripping means;
   a slide member slidably receivable within such one channel member; and
   means for securing together said bracket member and said slide member such that said bracket member and said slide member securely capturably slidably are engageable with such one channel member to provide for the secure gripping engagement of said edge region by such gripping means wherein said edge region of said bracket member includes a first shoulder region for supporting such rooftop accessory on said adaptor device and a second shoulder region generally opposing said first shoulder region for securing such rooftop accessory to said adaptor device.

5. The device of claim 4, wherein said first shoulder region includes a recess extending a predefined distance therealong generally parallel with said edge region, said recess being dimensioned to receive such standoff member at least partway therein, thereby limiting relative siding movement between such gripping means and said bracket member.

6. The device of claim 4, wherein said first shoulder region is inclined relative to said bottom surface.

7. The device of claim 5, wherein said first shoulder region is inclined relative to said bottom surface.

8. For use with a vehicular rooftop rail system including plural laterally spaced channel members and with a vehicular rooftop accessory including a vehicular rooftop gutter-gripping structure, such gutter-gripping means including a depending standoff member, an adaptor device comprising:

a cross-sectionally generally C-shaped bracket member each including a generally planar bottom surface configured for mating an upper surface of one or more of such channel members, said bracket member further including an edge region having formed therein a recess for receiving such support member, said edge region being securely engageable by such gripping structure with such support member extending into said recess;

plural slide members slidably receivable within such one channel member; and plural threaded fasteners for securing together said bracket member and said slide members such that said bracket member and said slide members securely capturably slidably are engageable with such one channel member to provide for the secure gripping engagement of said edge region by such gripping structure.

9. For use with a vehicular rooftop rail system including plural laterally spaced channel members and with a vehicular rooftop accessory including a vehicular rooftop gutter-gripping structure in which such gripping structure includes a depending support member, an adaptor device comprising:

a cross-sectionally generally C-shaped bracket member each including a generally planar bottom surface configured for mating an upper surface of one or more of such channel members, said bracket member further including an edge region securely engageable by such gripping structure, wherein said edge region includes a recess formed therein for receiving such depending support member, said recess being dimensioned laterally and lengthwise to limit lateral and lengthwise movement of such support member when the same is received within said recess;

plural slide member slidably receivable within such one channel member; and plural threaded fasteners for securing together said bracket member and said slide members such that said bracket member and said slide members securely capturably slidably are engageable with such one channel member to provide for the secure gripping engagement of said edge region by such gripping structure.

10. The device of claims 1, 2, 3, 4, 5, 6, 7, 8 or 9, wherein said bracket member is unitary and is formed by ball milling an extrusion.

11. For use with a vehicular rooftop rail system including plural laterally spaced channel members and with a vehicular rooftop accessory including a vehicular rooftop gutter-gripping structure, an adaptor device comprising:

one or more cross-sectionally generally C-shaped bracket members each including a generally planar bottom surface configured for mating an upper surface of one or more of such channel members, each of said bracket members further including an edge region securely engageable by such gripping structure, said edge region including a first recess of predefined length formed in a first shoulder region and a second recess formed therein to define a second shoulder region generally opposing said first shoulder region, said second recess being elevated at a predefined height above said bottom surface;

plural slide members slidably receivable within such one channel member, said slide members each having formed therein a hole that is tapped to receive a threaded fastener; and plural threaded fasteners for securing together each of said bracket members and said slide members such that said bracket members and said slide members securely capturably slidably are engageable with such one channel member to provide for the secure gripping engagement of said edge region by such gripping structure.

* * * * *